Aug. 18, 1925.

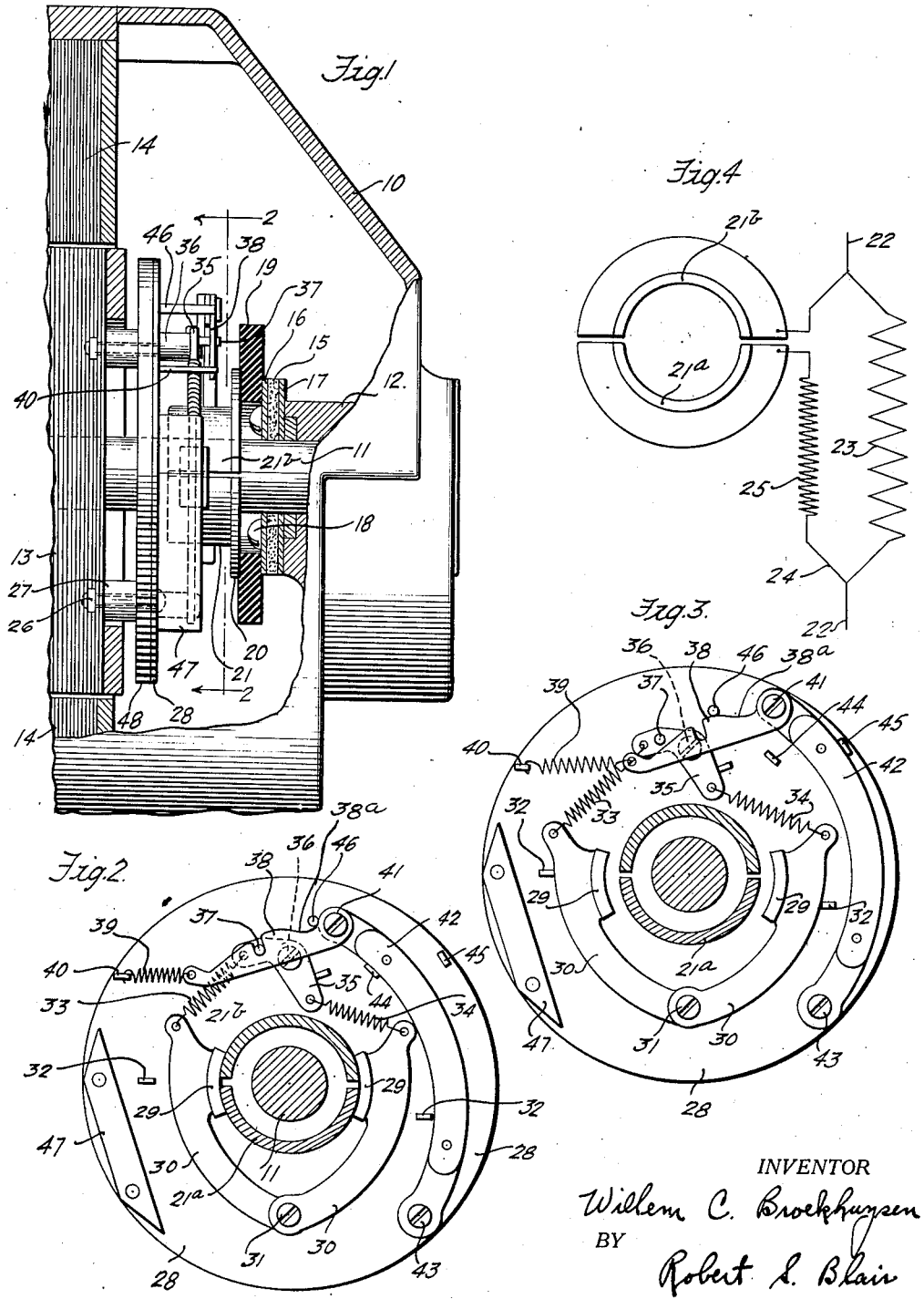

W. C. BROEKHUYSEN

MOTOR STARTING

Filed Nov. 20, 1923

1,550,147

2 Sheets-Sheet 2

INVENTOR
Willem C. Broekhuysen
BY
Robert S. Blair
ATTORNEY

Patented Aug. 18, 1925.

1,550,147

UNITED STATES PATENT OFFICE.

WILLEM C. BROEKHUYSEN, OF NEW HAVEN, CONNECTICUT, ASSIGNOR TO THE SAFETY CAR HEATING & LIGHTING COMPANY, A CORPORATION OF NEW JERSEY.

MOTOR STARTING.

Application filed November 20, 1923. Serial No. 675,908.

*To all whom it may concern:*

Be it known that I, WILLEM C. BROEKHUYSEN, a subject of the Queen of Holland, and a resident of New Haven, in the county of New Haven and State of Connecticut, have invented an Improvement in Motor Starting, of which the following is a specification.

This invention relates to motor starting and with regard to its more specific features to mechanism employed in starting single phase motors.

One of the objects of the invention is to provide apparatus of the above nature which is practical and efficient and capable of meeting the requirements of use in a highly satisfactory manner. Another object is to provide such apparatus dependable in action and adapted to operate in a manner conducive to greatest efficiency and reduction of wear and deterioration. Another object is to provide an apparatus of the above nature which is readily and inexpensively constructed and conveniently applicable to practical use. Other objects will be in part obvious or in part pointed out hereinafter.

The invention accordingly consists in the features of construction, combinations of elements and arrangements of parts as will be exemplified in the structure to be hereinafter described and the scope of the application of which will be indicated in the following claims.

Figure 5:
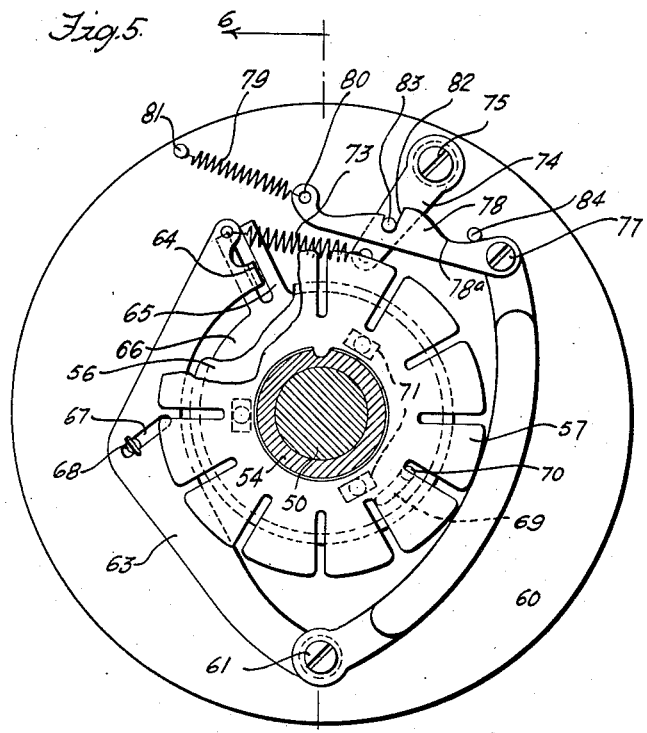
Figure 6:
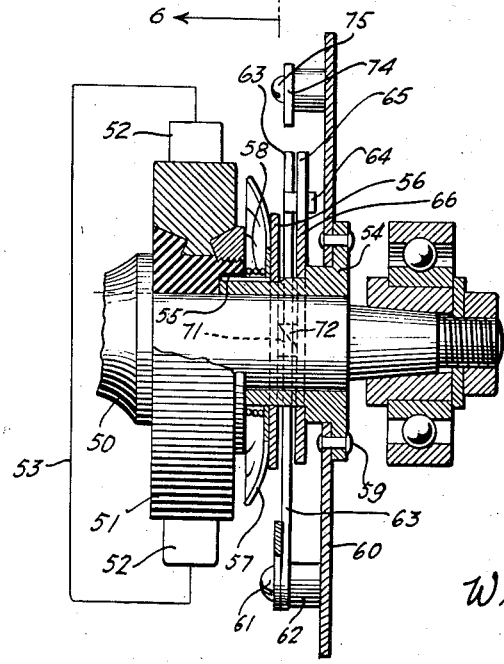

In the accompanying drawing in which is shown one or more of the various possible embodiments of the several features of this invention, Figure 1 is a fragmentary side elevation of an end of an electric motor the casing being cut away to disclose the interior, Figure 2 is a detached sectional view of parts shown in Figure 1, the section being taken along the line 2—2 of that figure, Figure 3 is a view similar to Figure 2 showing the parts in another position, Figure 4 is a diagrammatic representation of the field circuit of the motor and the commutator, and Figure 5 shows in elevation a different embodiment of features of the invention, and Figure 6 is a section taken along the line 6—6 of Fig. 5 showing an armature shaft and commutator.

Similar reference characters refer to similar parts throughout the several views of the drawing.

Referring now to the drawing in detail, in Figure 1 there is shown, broken away, the end portion of the casing 10 of an electric motor. The armature shaft 11 is shown supported at its end in a suitable bearing 12 and carrying the rotor 13. Supported inside the casing 10 are the field magnets or windings 14 arranged about the rotor 13. Adjacent the inner end of the bearing 12 is a packing washer 15 of felt or the like adapted to prevent admission of lubricant from the bearing to the interior of the motor, the washer 15 being held between a pair of plates 16 and 17 and held in place as by screws 18. Against the inner plate 16 rests an annular member 19 of insulating material, against which rests the flanged portion 20 of a commutator 21. The commutator 21 and the insulating member 19 are firmly secured to the bearing 12 in any desired manner, as for example, by screws passing through the flange 20, the insulating member 19 and into the bearing 12. The commutator 21 is thus dependably secured to the stationary bearing 12 and is insulated therefrom and from the armature shaft 11 which passes therethrough.

It may be here noted that the motor shown in Fig. 1 of the drawing is an alternating current single phase motor in which is employed what is known as the split phase method of starting. As is well known in this type of motor an auxiliary field winding is employed for starting in addition to the main field winding, which auxiliary winding is cut out when the motor comes up to the desired speed. Referring now to Figure 4 there is shown the commutator 21 comprising two substantially semi-circular sections $21^a$ and $21^b$. Across the main line 22 is connected the main field or stator winding 23 and about the latter is shunted through a conductor 24 a starting winding 25, connected through the two sections of the commutator 21. It will be seen that, as is shown in Figure 4, the two sections of the commutator 21 break the circuit through the starting winding 25 and that without electrical connection between the commutator sections $21^a$ and $21^b$ no current passes through the winding 25.

Referring again to Figure 1, there is shown secured to the end of the rotor 13 as by bolts 26 and spaced therefrom as by collars 27 an annular insulating plate member 48 upon which is attached an annular plate member 28. The member 28 thus rotates with the rotor 13 and forms a supporting member for mechanisms which are more clearly shown in Figures 2 and 3. Referring to Figure 2, there are shown the two sections 21ª and 21ᵇ of the commutator 21 spaced from the armature shaft 11, and, in engagement with the commutator 21 is a pair of brushes or contact members 29. The contacts 29 are spaced about 180° apart and are mounted upon and electrically connected by a pair of arms 30 which are pivoted upon a common pin 31 mounted in the supporting member 28. The contacts 29 and the arms 30 upon which they are mounted therefore make electrical connection between the two sections of the commutator 21 when the contacts are in engagement with the commutator and thereby complete the circuit through the starting winding 25 shown in Fig. 4. The arms 30 are capable of swinging outwardly from the commutator 21 until they strike stops 32 and by such movement of the arms 30 the brushes or contacts are drawn out of engagement with the commutator.

Connected adjacent the ends of the arms 30 is a pair of springs 33 and 34 joined at their other ends with the respective arms of the bell crank lever 35 which is pivoted upon a pin 36 projecting from the supporting member 28. The bell crank lever 35 is provided with a pin 37 which is adapted to engage a notch in a member 38. At the left hand end of the member 38 is connected a spring 39 secured to the supporting member 28 as at 40 and the other end of the member 38 is pivotally connected as by a pin 41 with the end of an arm 42. The arm 42 is pivoted at its other end upon a pin 43 projecting from the supporting member 28 and is thereby capable of swinging about the pin 43 between the stops 44 and 45 provided therefor.

Considering now the action of this mechanism, at starting, the parts will be substantially in the positions shown in Figure 2, the contacts 29 being in engagement with the commutator 21 and the starting winding 25 being therefore connected in circuit. As the rotor 13 starts to rotate the supporting member 28 and the mechanism mounted thereon rotate about the stationary commutator 21. The arm 42 is preferably of substantial weight and upon the supporting member 28 rotating is urged by centrifugal force to swing outwardly about its pivot 43. Such movement of the arm 42 moves the member 38 to the right as viewed in Figure 2 against the action of the spring 39 and this movement of the member 38 through the pin 37 turns the bell crank lever 35 about the pivot 36 in a clockwise direction. This rotation of the lever 35 increases the tension in the springs 33 and 34 thereby urging the contacts 29 with increased force against the commutator 21. The arms 30 and the contacts 29 mounted thereon tend to swing outwardly about the pivot 31 under the urge of centrifugal force and the increased tension in the springs 33 and 34 thus counteracts this centrifugal action upon the brushes or contacts to keep their contact pressure against the commutator always substantially constant. As the speed of the rotor increases the tendency of the brushes to fly outwardly away from the commutator by centrifugal force increases, but at the same time the tension in the springs 33 and 34 is proportionately increased by the movement of the arm 42 due to centrifugal force and thus with increasing speed the contact pressure is maintained substantially constant. Furthermore, it will be seen that due to the connection of the springs 33 and 34 with the common member 35, the contact pressure at one brush is constantly maintained equal to that at the other.

Projecting from the face of the supporting member 28 is a pin 46 against which the upper surface 38ª of the right-hand portion of the member 38 bears and along which it slides as the member 38 is moved by the movement of the arm 42. This surface 38ª provides a cam surface which is so shaped that when sliding to the right along the pin 46 it urges the left-hand end of the member 38 downwardly as viewed in Figure 2 against the action of the spring 39. This downward movement of the member 38 under the influence of the cam surface 38ª tends to cause disengagement of the pin 37 with the notch in the arm 38. The cam surface 38ª is so shaped that upon movement of the arm 42 outwardly to a predetermined extent the pin 37 is suddenly released from engagement with the notch in the arm 38 thereby permitting the bell crank lever 35 to swing in a counter-clockwise direction about its pivot 36 under the urge of the springs 33 and 34. The tension in the springs 33 and 34 thus being released, the arms 30 are permitted to swing or snap outwardly under the urge of centrifugal force against their stops 32 thereby removing the contacts 29 from engagement with the commutator 21. The parts are shown in this position of disengagement or release in Figure 3. The contacts 29 are out of engagement with the commutator 21 and the circuit through the starting winding 25 is broken.

By means of the apparatus described above the contact pressure of the contacts against the commutator may be maintained at substantially the desired amount from the starting of the motor through the period of its increasing speed and up to the point of breaking contact. Upon breaking contact the brushes or contacts are suddenly released without gradual diminution of contact pressure and thus sparking at the brushes and the undesirable consequences thereof are avoided. The parts may be so proportioned that the increasing tension in the springs 33 and 34 is substantially equal to the increasing urge of centrifugal force upon the brushes and their supporting arms as the motor speeds up and so that the release takes place at substantially the desired rate of speed of the motor. A member 47 may be secured to the face of the supporting member 28 opposite the arm 42 to serve as a counterbalance.

Referring now to Figures 5 and 6 of the drawings there are shown the armature shaft 50 and commutator 51 of a single phase motor in which is employed what is commonly known as the induction repulsion method of starting. The commutator 51 is mounted upon the armature shaft 50 and the segments thereof are, as will be understood, connected with the respective windings of the armature in the usual manner. In starting this type of motor opposite segments of the commutator are connected as diagrammatically represented by the brushes 52 and the conductor 53 to complete a circuit through the armature. Current then being applied to the stator windings the motor starts up as a repulsion motor. When the motor has come up to speed the commutator segments are all short circuited one with another and the brushes 52 may be removed from contact with the commutator to save them from wear. The motor now runs as an ordinary synchronous single-phase motor.

As shown in Figure 6, there is mounted upon the armature shaft 50 to rotate therewith a sleeve or collar 54. Keyed upon this sleeve 54, as at 55, is an annular plate member 56 thus adapted to move along the collar 54 toward and away from the commutator 51. The plate 56 carries an annular contact member 57 and is urged away from the commutator 51 by means of a spring 58. This contact member 57 is preferably formed of flexible metal and its periphery is preferably arched toward the commutator 51 and bifurcated as clearly shown in Figure 5. This contact member 57 therefore when urged toward the commutator 51 against the action of the spring 58 yieldingly engages the sides of the commutator bars and short circuits all of the latter.

Secured to the collar 54, as by rivets 59, is an annular supporting plate 60. Pivoted upon a pin 61 mounted in a lug 62 upon the supporting plate 60 is an arm 63 which is best shown in Figure 5. The end of this arm 63 opposite the pivot 61 is provided with a projection or bent-over portion 64 which engages the forked projection 65 on the periphery of an annular member 66. The member 66 is loosely mounted upon the collar or sleeve 54. It will be seen that as the armature shaft 50 rotates carrying the supporting plate 60 therewith the arm 63 is urged to swing outwardly about its pivot 61 by centrifugal force. Such movement of the arm 63 through the projection 64 will cause a rotation of the member 66 upon the collar 54 in the direction indicated by the arrow in Figure 5. The arm 63 is provided with a slot 67 in engagement with a pin 68 upon the surface of the supporting member 60 to limit the swinging movement thereof. The member 66 is also preferably provided with a slot 69 in engagement with a pin 70 to limit the rotative movement of the member 66 upon the collar 54.

Upon the annular plate 56 which, as before described, carries the contact member 57 and is urged away from the commutator 51 by the spring 58 are secured cams 71 shown as three in number. These cams 71 have sloping surface and mating therewith are cams 72 secured to the surface of the annular member 66. Thus upon movement of the arm 63 outwardly, due to centrifugal force, as above described, and consequent rotation of the member 66 upon the collar 54, the cams 71 and 72 act to force the member 56 and the contact member 57 carried thereby toward the commutator 51 against the action of the spring 58. Conversely upon cessation of the centrifugal action upon the arm 63, or in other words, when the armature comes to rest the spring 58 will force the contact member 57 and the member 56 away from the commutator, and through the cams 71 and 72 the member 66 and the arm 63 will be returned to initial position as shown in the drawing.

The end of the arm 63 adjacent the projection 64 is connected by a spring 73 with the end of a lever 74 which is pivoted upon the supporting member 60 as at 75. Pivoted upon the same pin 61 upon which the arm 63 is pivoted is an arm 76 to the other end of which is pivotally connected, as at 77, a member 78. A spring 79 connected with the other end of the member 78, as at 80, is anchored to the supporting plate 60 at 81. The member 78 has a notch 82 adapted to engage with a pin 83 on the lever 74.

As the supporting plate 60 rotates with the armature shaft the arm 76 is urged by centrifugal force to swing outwardly about the pivot 61 against the action of the spring 79. Such outward movement of the arm 76 through the pin connection 83 swings the lever 74 about its pivot 75 thus increasing the tension in the spring 73 connected to the arm 63. At the same time that the arm 76 is being urged outwardly by centrifugal force the arm 63 is likewise being urged outwardly by centrifugal force and the spring 73 restrains this outward movement of the arm 63. As the speed of the armature shaft increases the centrifugal force increases and the arm 76 which is suitably proportioned and weighted swings outwardly and as has been described this movement increases the tension in the spring 73 opposing the outward movement of the arm 63 by centrifugal force. At the same time the centrifugal force upon the arm 63 is increasing and the parts are preferably so proportioned that the increase in tension in the spring 73 substantially counteracts the increase in centrifugal force upon the arm 63 so that the arm 63 does not swing outwardly. Thus as the speed of the armature shaft increases the arm 63 being restrained from outward movement by an increasing force does not move outwardly and the contact member 57 is held away from the commutator substantially in the position shown in the drawing by the spring 58.

Mounted upon the surface of the supporting plate 60 is a pin 84 adapted to be engaged by the surface 78ᵃ of the member 78 and along which the surface 78ᵃ is adapted to slide as the arm 76 swings outwardly by centrifugal force. This surface 78ᵃ provides a cam surface which as it slides on the pin 84 urges the member 78 in a downward direction as viewed in Figure 5. Such downward movement of the member 78 moves the slot 82 therein out of engagement with the pin 83 upon the lever 74. When this disengagement takes place the tension in the spring 73 opposing the outward swinging of the arm 63 is suddenly released and the arm 63 swings quickly or snaps outwardly. This movement of the arm 63 through the member 66 and the cams 71 and 72 forces the contact member 57 against the commutator 51 compressing the spring 58. It will be seen that this action is substantially instantaneous upon the breaking of the connection between the slot 82 and the pin 83 and gradual movement of the contact 57 into engagement with the commutator is avoided. In this manner sparking and the undesirable consequences thereof are avoided. The cam surface 78ᵃ is so shaped and the other parts are preferably so proportioned that the release at the pin 83 takes place when the armature shaft has attained the desired speed.

Upon stopping the motor the parts will again resume the starting position shown in the drawing. The spring 79 draws the arm 76 back to normal position, the spring 58 forces the contact member 57 away from the commutator thus rotating the member 66 through the cams 71 and 72 and drawing the arm 63 inwardly, and the pin 83 of the lever 74 drops into engagement with the slot 82.

From the above it will be seen that there is herein provided apparatus which embodies the features of this invention and attains the objects thereof and that the same is well adapted to meet the requirements of practical use. The mechanisms are positive in action and dependable throughout and, as will be readily seen, attain many practical and useful advantages.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In apparatus of the general nature of that herein described, in combination, a pair of contact devices mounted for relative movement into and out of engagement one with the other, means actuated by centrifugal force normally tending to relatively move said devices, and means actuated by centrifugal force adapted to control the actuation of said first means.

2. In apparatus of the general nature of that herein described, in combination, a pair of contact devices mounted for relative movement into and out of engagement one with the other, means actuated by centrifugal force normally tending to relatively move said devices, means restraining the actuation of said first means, and means actuated by centrifugal force adapted upon actuation to augment said restraining means and upon predetermined further actuation to release said restraining means.

3. In apparatus of the general nature of that herein described, in combination, a pair of contact devices mounted for relative movement into and out of engagement one with another, means tending to relatively move said devices, means restraining the actuation of said first means, means actuated by centrifugal force adapted upon actuation to increase said restraining means, and means adapted upon predetermined actuation of said last means to release said restraining means.

4. In apparatus of the general nature of that herein described, in combination, a pair of contact devices mounted for relative movement into and out of engagement one with another, means tending to relatively move said devices, centrifugally actuated means acting in opposition to said first means, and a connection between said two means adapted upon predetermined actuation of said second means to release said first means therefrom.

5. In apparatus of the general nature of that herein described, in combination, a pair of contact devices mounted for relative movement into and out of engagement one with the other, a member adapted to be actuated by centrifugal force to relatively move said two devices, a second member adapted to be actuated by centrifugal force and connected to said first member to act in opposition thereto, and means associated with said connection adapted upon predetermined actuation of said second member to release said first member.

6. In apparatus of the general nature of that herein described, in combination, an armature shaft, a commutator, a contact device mounted for movement into and out of engagement with said commutator, means normally tending to move said contact device relative to said commutator, and means rotatable with said shaft actuated by centrifugal force adapted to control the actuation of said first means.

7. In apparatus of the general nature of that herein described, in combination, an armature shaft, a commutator, a contact device mounted for movement into and out of engagement with said commutator, means rotatable with said shaft and actuated by centrifugal force tending to move said contact device relative to said commutator, and means rotatable with said shaft actuated by centrifugal force adapted to control the actuation of said first means.

8. In apparatus of the general nature of that herein described, in combination, an armature shaft, a commutator, a contact device mounted for movement into and out of engagement with said commutator, means tending to move said contact device relative to said commutator, means restraining said movement, and means rotatable with said shaft adapted to increase said restraining means as the speed of said shaft increases.

9. In apparatus of the general nature of that herein described, in combination, an armature shaft, a commutator, a contact device mounted for movement into and out of engagement with said commutator, means tending to move said contact device relative to said commutator, means rotatable with said shaft actuated by centrifugal force and restraining said first means, and means associated with said second means adapted upon predetermined speed of said shaft to release said first means therefrom.

10. In apparatus of the general nature of that herein described, in combination, an armature shaft, a commutator, a contact device mounted for movement into and out of engagement with said commutator, means tending to move said contact device relative to said commutator, means restraining said movement, means rotatable with said shaft adapted to augment said restraining means as the speed of said shaft increases, and means coacting with said last means adapted upon predetermined speed of said shaft to release said restraining means.

11. In apparatus of the general nature of that herein described, in combination, a stationary commutator, contact members adapted to rotate about said commutator and coact therewith, means urging said contact members into engagement with said commutator, and means adapted to increase the pressure of said last means as the speed of said contacts increases, to counteract the effect of centrifugal force thereon.

12. In apparatus of the general nature of that herein described, in combination, a stationary commutator, contact members adapted to rotate about said commutator and coact therewith, means urging said contact members against said commutator, means adapted to move said contacts out of engagement with said commutator at predetermined speed, and means adapted to increase the force of said means urging said contacts against said commutator to maintain the contact pressure substantially constant up to said predetermined speed.

13. In apparatus of the general nature of that herein described, in combination, a commutator, contact members adapted to coact therewith and mounted for rotation relative thereto, means urging said contact members and said commutator into engagement, and means adapted at a predetermined speed of relative rotation to release said last means substantially instantaneously, to permit disengagement of said commutator and said contact members by centrifugal force.

14. In apparatus of the general nature of that herein described, in combination, a stationary commutator, contact members adapted to rotate about said commutator and coact therewith, means urging said contact members toward said commutator against the action of centrifugal force, and means adapted to increase the pressure of said last means as the centrifugal force increases to maintain the contact pressure substantially constant.

15. In apparatus of the general nature of that herein described, in combination, a commutator, contact members adapted to rotate about said commutator and coact therewith and capable of movement away therefrom by centrifugal force, means urging said contact members against said commutator, means actuated by centrifugal force adapted to release said contact members from engagement with said commutator at a predetermined speed, and means coacting with said first means adapted to increase the pressure thereof to maintain the contact pressure substantially constant from starting up to said predetermined speed.

16. In apparatus of the general nature of that herein described, in combination, a commutator, contact members adapted to rotate about said commutator and coact therewith and capable of movement away therefrom by centrifugal force, means adapted to maintain substantially constant pressure between said commutator and said contacts as the speed of rotation of said contacts and the centrifugal force acting thereon increases, and a latch mechanism adapted to release said pressure upon attainment of a predetermined speed.

17. In apparatus of the general nature of that herein described, in combination, a stationary commutator, a plurality of brushes mounted to rotate about said commutator and coact therewith, means urging said brushes against said commutator, means associated with said last means adapted to equalize the pressure on said brushes, and means adapted to increase said pressure as the speed of rotation of said brushes increases.

18. In apparatus of the general nature of that herein described, in combination, a stationary commutator, brushes adapted to rotate about said commutator and coact therewith and mounted for movement into and out of engagement therewith in a substantially radial direction, resilient means holding said brushes against said commutator, and means adapted to increase the pressure of said last means as the speed of said brushes increases.

19. In apparatus of the general nature of that herein described, in combination, a stationary commutator, a plurality of brushes adapted to rotate about said commutator and coact therewith and mounted for movement into and out of engagement therewith in a substantially radial direction, common means urging each of said plurality of brushes into engagement with said commutator, and a device adapted to increase the pressure of said common means as the speed of said brushes increases.

20. In apparatus of the general nature of that herein described, in combination, a stationary commutator, a plurality of brushes adapted to rotate about said commutator and coact therewith and mounted for movement into and out of engagement therewith in a substantially radial direction by centrifugal force, means urging said brushes into engagement with said commutator, a member rotatable about said commutator and movable therefrom in a radial direction by centrifugal force, and means associated with said member adapted upon predetermined movement thereof to release the pressure of said first means and permit said brushes to move outwardly by centrifugal force.

21. In apparatus of the general nature of that herein described, in combination, a stationary commutator, a plurality of brushes adapted to rotate about said commutator and coact therewith and mounted for movement into and out of engagement therewith in a substantially radial direction, means urging said brushes into engagement with said commutator, a member rotatable about said commutator and movable therefrom in a radial direction by centrifugal force, and means actuated by said member adapted upon radial outward movement thereof to increase the pressure of said first means.

22. In apparatus of the general nature of that herein described, in combination, a stationary commutator, a plurality of brushes adapted to rotate about said commutator and coact therewith and mounted for movement into and out of engagement therewith in a substantially radial direction, means urging said brushes into engagement with said commutator, a member rotatable about said commutator and movable therefrom in a radial direction by centrifugal force, means actuated by said member adapted upon radial outward movement thereof to increase the pressure of said first means, and means adapted upon movement of said member to a predetermined extent to release the pressure of said first means.

23. In apparatus of the general nature of that herein described, in combination, a rotor, a supporting member mounted to rotate therewith, a stationary commutator, brushes mounted upon said supporting member adapted to coact with said commutator and movable toward or away therefrom in a substantially radial direction, means urging said brushes toward said commutator, a member mounted upon said supporting member and movable radially by centrifugal force, and a connection adapted to increase the pressure of said means urging said brushes as said last member moves.

24. In apparatus of the general nature of that herein described, in combination, a rotor, a supporting member mounted to rotate therewith, a stationary commutator, brushes pivoted upon said supporting member to swing into and out of engagement with said commutator, a member pivoted upon said supporting member adapted to swing outwardly by centrifugal force, and means adapted to urge said brushes toward said commutator with increasing force as said member swings outwardly.

25. In apparatus of the general nature of that herein described, in combination, a rotor, a supporting member mounted to rotate therewith, a stationary commutator, a pair of brushes pivoted upon said supporting member to swing into and out of engagement with said commutator, a bell crank lever pivoted upon said supporting member, springs connecting each of said brushes with an end of said lever adapted to urge said brushes toward said commutator, a device mounted on said supporting member adapted to be moved by centrifugal force, and means coacting with said device and said lever adapted to increase the tension in said springs as said device is moved.

26. In apparatus of the general nature of that herein described, in combination, a rotor, a supporting member mounted to rotate therewith, a stationary commutator, a pair of brushes pivoted upon said supporting member to swing into and out of engagement with said commutator, a bell crank lever pivoted upon said supporting member, springs connecting each of said brushes with an end of said lever adapted to urge said brushes toward said commutator, a member mounted on said supporting member and adapted to move outwardly as the speed of said rotor increases, and a connection between said member and said lever adapted to increase the tension in said springs as said speed increases and adapted to release said tension upon attainment of a predetermined speed to permit disengagement of said brushes and said commutator.

In testimony whereof, I have signed my name to this specification this 1st day of November, 1923.

WILLEM C. BROEKHUYSEN.